United States Patent [19]

Tsilibes et al.

[11] Patent Number: 4,748,465

[45] Date of Patent: May 31, 1988

[54] METHOD AND APPARATUS FOR CONTROLLING CHARGE ON A PHOTOCONDUCTOR

[75] Inventors: George N. Tsilibes, Rochester; Allen J. Rushing, Webster, both of N.Y.

[73] Assignee: Eastman Kodak Company, Rochester, N.Y.

[21] Appl. No.: 905,609

[22] Filed: Sep. 9, 1986

Related U.S. Application Data

[63] Continuation-in-part of Ser. No. 538,294, Oct. 3, 1983.

[51] Int. Cl.⁴ .............................................. G01D 15/10

[52] U.S. Cl. .................................. 346/160; 346/160.1

[58] Field of Search .................. 346/153.1, 160, 160.1; 355/3 CH, 14 CH; 358/300, 307; 400/119; 101/DIG. 13

[56] References Cited

U.S. PATENT DOCUMENTS

| | | | |
|---|---|---|---|
| 3,788,739 | 1/1974 | Coriale | 346/160 |
| 3,835,380 | 9/1974 | Webb | 346/160 |
| 3,851,229 | 11/1974 | Hayne et al. | 346/160 |
| 3,898,001 | 8/1975 | Hardenbrooke et al. | 346/160 |
| 3,934,141 | 1/1976 | Vargas, Jr. | 346/160 |
| 3,944,354 | 3/1976 | Benwood et al. | 346/160 |
| 4,105,321 | 8/1978 | Urso | 346/160 |
| 4,248,519 | 2/1981 | Urso | 346/160 |
| 4,355,885 | 10/1982 | Nagashima | 346/160 |
| 4,400,740 | 8/1983 | Traino et al. | 346/160 |
| 4,408,871 | 10/1983 | Kojima | 346/160 |
| 4,417,804 | 11/1983 | Werner, Jr. | 346/160 |
| 4,432,634 | 2/1984 | Tabuchi | 346/160 |
| 4,491,875 | 1/1985 | Kawamura | 346/160 |
| 4,507,373 | 3/1985 | Tsilibes | 346/160 |
| 4,542,392 | 9/1985 | Schulz-Hennig | 346/160 |
| 4,563,694 | 1/1986 | Ohkubo et al. | 346/160 |
| 4,564,287 | 1/1986 | Suzuki et al. | 346/160 |

FOREIGN PATENT DOCUMENTS

| | | | |
|---|---|---|---|
| 0051978 | 5/1982 | European Pat. Off. | 346/160 |
| WO85/01594 | 4/1985 | PCT Int'l Appl. | 346/160 |

OTHER PUBLICATIONS

IBM Technical Disclos. Bulletin, vol. 24, No. 1B, Jun. 1981.

*Primary Examiner*—Arthur G. Evans
*Attorney, Agent, or Firm*—Norman Rushefsky

[57] ABSTRACT

In an electrophotographic reproduction apparatus and method a corona charger is used for depositing an electrostatic charge of one polarity upon a moving photoconductor prior to making an exposure. In a calibration phase, an electrometer moves across the photoconductor and measures the level of charge at selected locations across the photoconductor to provide data regarding the distribution of charge in a direction of movement. This data is compared with a desired range of values. Where the level of charge is measured at some locations to be outside of the desired range of values, then the level of charge at such locations on the photoconductor is adjusted selectively.

65 Claims, 10 Drawing Sheets

METHOD AND APPARATUS FOR CONTROLLING CHARGE ON A PHOTOCONDUCTOR

CROSS REFERENCE TO RELATED APPLICATION

This application is a continuation-in-part application of U.S. Ser. No. 538,294, filed Oct. 3, 1983 in the name of George N. Tsilibes.

This application is also related to U.S. application Ser. No. 538,602, filed Oct. 3, 1983 and now U.S. Pat. No. 4,507,373.

BACKGROUND OF THE INVENTION

1. Field of the Invention

This invention relates to electrophotography, and more particularly to an improved method and apparatus for controlling the level of electrostatic charge on a surface upon which an electrophotographic image is to be made.

2. Description of the Prior Art

In known electrophotographic reproduction apparatus such as copiers or duplicators, an electrostatic charge is deposited on an area of a photoconductor as the area is moved past a charging station. The photoconductor is then moved to an exposure station where the area is exposed to image-forming radiation to form a latent electrostatic image of a document to be copied. The latent image is thereafter developed and, in the case of plain-paper copiers and duplicators, subsequently transferred to paper upon which the copied image is to appear. Thereafter, the photoconductor is cleaned and otherwise made ready for the next copy cycle.

In such apparatus, it is important to impart a generally uniform charge over the area upon which the latent image is to be formed. Too low a charge in portions of the area may result in weak, washed-out looking areas on copies, and too great a charge in portions of the area may result in areas on copies being too dark relative to other areas. Therefore, copy quality, particularly with pictorial subject matter, is affected seriously where a non-uniform charge is placed on the photoconductor.

In the prior art, as exemplified by U.S. Pat. No. 4,105,321, an apparatus is described for controlling the level of charge placed on a photoconductor. In this apparatus a corona wire is energized to deposit a positive electrostatic charge on a photoconductive belt. This level of charge imparted to the belt is measured by an electrometer that is located proximate the belt and a signal from the electrometer is compared with a reference signal that represents a maximum level to which it is desired to charge the belt. If the signal derived from the electrometer indicates that the charge is beyond this maximum level, an erase light source is illuminated to the brightness necessary to reduce the level of charge deposited on the belt.

In electrophotography, it is known to charge a photoconductor with either a negative or a positive electrostatic charge, the particular charge chosen being a selection based on the type of photoconductor used. This charge is preferably deposited by a corona charging system comprising one or more corona wires which lie transverse to the direction of movement of the photoconductor past the charging station. In the case of employing positive corona charging, a generally uniform charge can be expected to be deposited on the photoconductor using known charging techniques. In the case of negative corona charging, control is more difficult, and a considerable amount of charge non-uniformity can result. One may observe the glow from a positively charged corona wire and note a uniform glow surrounding the entire length of the wire to indicate uniform current flow from the wire to the photoconductor. On the other hand, discrete glow spots often occur along a negatively charged corona wire. The glow spots are associated with creating non-uniformities in charging of the photoconductor. As the glow spots appear at different positions along the wire over the course of a day due to changes in humidity within the copier or because of other factors, the non-uniformity of charging also changes with time (see R. M. Schaffert, Electrophotography, 1975 edition, pages 466–472). While minor amounts of non-uniformity may be tolerated, significant non-uniformity as indicated above represents a problem. The extent of the problem will depend upon the nature of the apparatus and the material to be copied. Obviously, continuous tone or halftone originals will be more of a problem than copying text. Color copiers demand even more uniformity in charging than do monotone copiers.

It would therefore be very desirable to have a method and apparatus for providing over the image-forming area of a photoconductor a generally uniform charge, particularly where because of the charging source used or because of other conditions there is a tendency for a non-uniform charge to otherwise be deposited on the surface in a direction transverse to the direction of movement of the surface past the charging source. As used herein, the term, "generally uniform charge," implies that variation in charge level may occur from one part of the area to another; however, the various parts comprising the area have a level of charge falling within a desired narrow range of values.

SUMMARY OF THE INVENTION

The invention pertains to an improved electrophotographic reproduction apparatus and method for controlling charge on a surface that is to be exposed to image-bearing radiation. The invention is directed to a method and apparatus wherein there is provided a charged moving member such as a photoconductor means for measuring the level of charge at each of a plural number of locations lying across the surface of the member in a direction transverse to the direction of movement of the member. Where the level of charge is measured at some locations to be outside of a desired range of values then the level of charge at such locations is adjusted selectively.

The invention is further directed to a method and apparatus for exposing an electrostatically charged member with a narrow beam of radiation to form an electrostatic latent image and wherein the beam is modulated by image information signals and by charge-adjusting information.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because apparatus of the type described herein are well known, the present description will be directed in particular to elements forming part of or cooperating more directly with the present invention.

Figure 1:
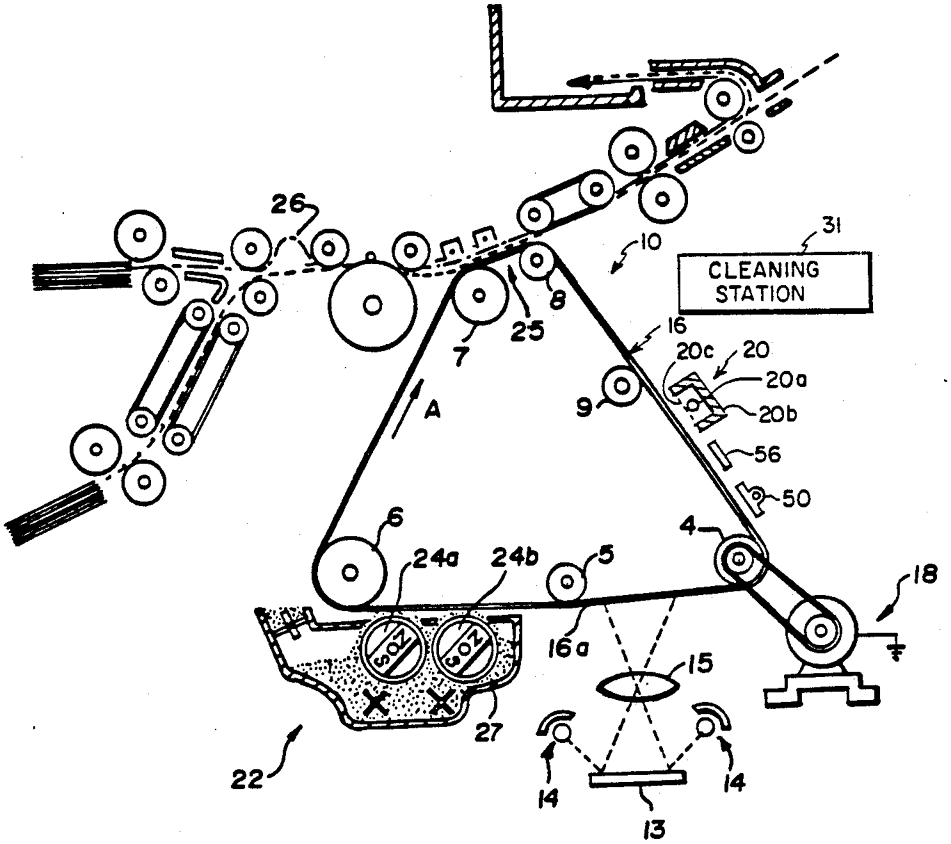
FIG. 1 is a side elevational view in schematic form of a copier which embodies apparatus in accordance with the invention.

For a general understanding of a web-type electrophotographic copier/duplicator apparatus 10 wherein the invention has utility, reference is made to FIG. 1. As shown, a photoconductor member, in the form of a photoconductive web 16, is trained about rollers 4 through 9 for movement in the direction indicated by the arrow A. Roller 4 is driven by a drive mechanism 18 shown for simplicity to include a motor-pulley arrangement. An insulating layer or surface 16*a* of the web 16 is charged at a corona charge station (charger) 20. The charger 20 includes one or more corona generating wires 20*a*, a shield 20*b*, and a grid 20*c* for regulating the flow of negative corona current from the wires to the photoconductor member. Thereafter and at an appropriate time, an information medium 13 such as a document is illuminated at an image exposure station by radiation from flash lamps 14. Such radiation is reflected from the medium and projected by a lens 15 onto the charged insulating surface 16a of the web 16, to selectively dissipate charge and form an electrostatic latent image of medium 13 on a specific area of the web. For more specific disclosures of the web, see commonly assigned U.S. Pat. Nos. 3,615,406 and 3,615,414, both issued Oct. 26, 1971. A plurality of light sources 56 and an electrometer 50 are disposed between the exposure station and the charger 20 as will be described in detail later.

The apparatus 10 further includes a development station 22 at which the moving electrostatic image is contacted with finely divided charged toner particles that adhere to the charged web surface in a configuration defined by the electrostatic image, to form a visible toner image; a transfer station 25 in which the toner image is transferred to a receiving surface of a copy sheet 26 on which it can be subsequently permanently fused; and a cleaning station 31 in which residual toner particles are removed from the web 16.

At the development station an electrostatic image on the insulating surface 16*a* of web 16 is moved past two magnetic brushes or rollers 24*a* and 24*b* mounted in a housing 27 of the development station 22. The housing 27 holds a supply of developer containing a mixture of toner and carrier particles. The brushes 24*a* and 24*b* can be constructed according to any one of a variety of designs known in the prior art. One such design is shown in commonly assigned U.S. Pat. No. 3,543,720 issued Dec. 1, 1970, in the names of Drexler et al. For a specific example of such a developer, see commonly assigned U.S. Pat. No. 3,893,935, issued July 8, 1975 to Jadwin et al. For a more complete description of the general organization of a similar copier apparatus, reference may be made to commonly assigned U.S. Pat. No. 4,025,186, issued May 24, 1977 to Hunt et al.

Although a web-type copier/duplicator has been shown, it will be understood that the present invention is also particularly suitable with copier/duplicator apparatus that use drums and also sheet film photoconductors. In any case, it will be understood by those skilled in the art that a microcomputer having a stored program can be effectively used as the logic and control apparatus to control the operation of the copier/duplicator. The details of one such microcomputer is disclosed in the above-referenced U.S. Pat. No. 4,025,186.

Figure 2:
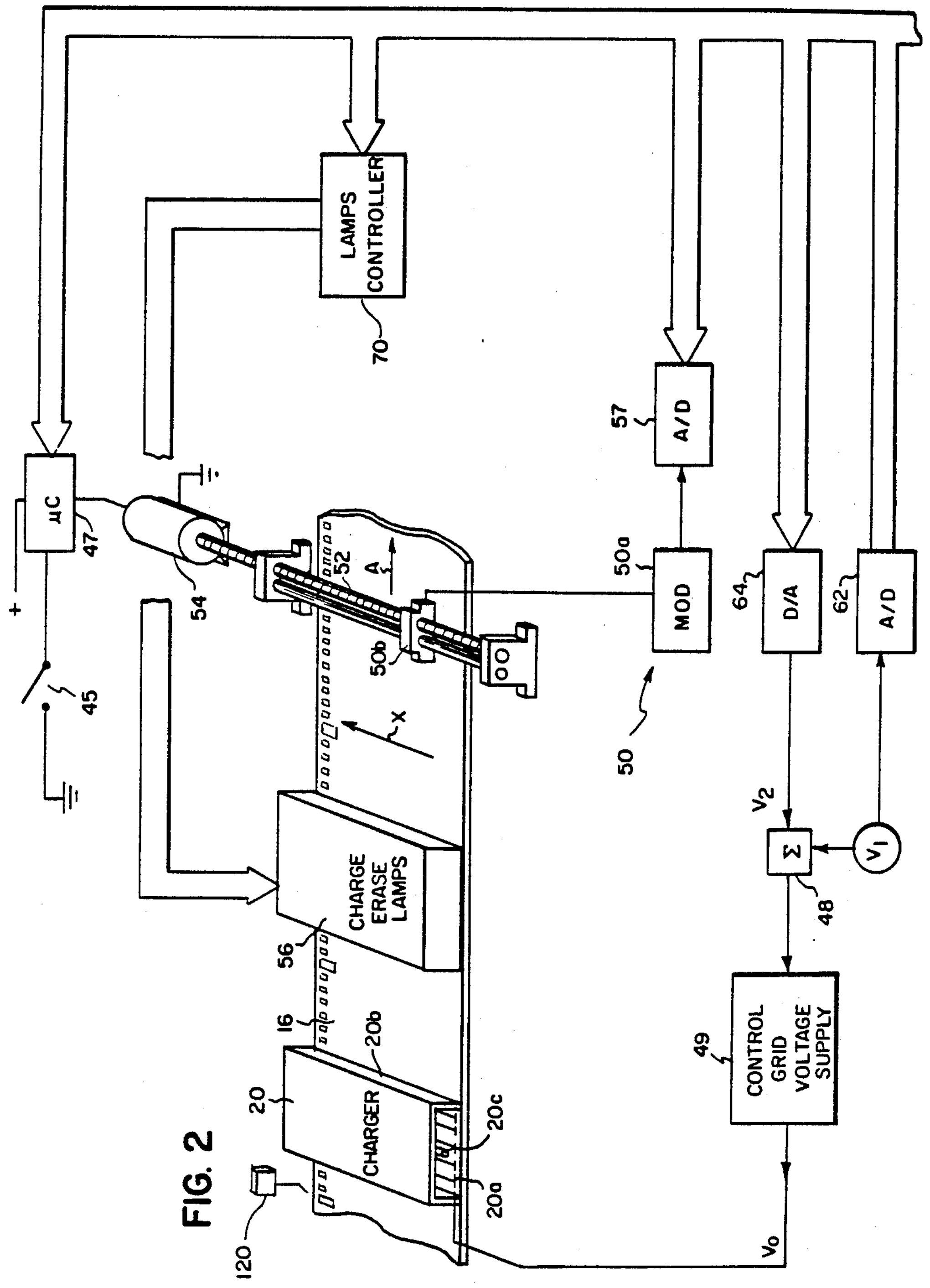
FIG. 2 is a schematic of a portion of the copier shown in FIG. 1 that is directed to the depositing of a generally uniform charge upon a photoconductor.

Turning now to FIG. 2, there is shown a schematic representation of apparatus that is assembled in accordance with the invention. The electrometer or electrostatic voltmeter 50 is conventional and includes a module 50*a* including power supply, amplifiers and output circuitry and a probe 50*b* that is mounted on a rotatable lead screw 52. When a stepper motor 54 is energized, it rotates the lead screw 52 which translates the electrometer probe 50*b* in a transverse direction indicated by the arrow x across the width of the web 16. A plurality of light sources 56 are disposed between the charger 20 and the electrometer probe 50*b*. The light sources each emit light of a suitable spectral frequency(ies) to which the photoconductor is sensitive to cause the exposed portions of the the photoconductor to become partially conductive to at least partially reduce the charge level appearing thereon. Such light sources may comprise a plurality of adjustable intensity lamps, each one of which delivers light to a respective light pipe which transmits it to a respective transverse location on web 16. Other light sources which may be used include plasma displays, LED arrays, digitally controlled electrolummescent panels, laser or halogen lamps or neon lamps with PLZT crystal apertures, and long arc lamps with PLZT crystal apertures. The preferred embodiment will be described with reference to a panel display. An example of such a panel display is Burroughs SELF-SCAN Panel Display, Model SSD0124-0039 which is described in further detail below.

Figures 4A, 4B, 4C, 4D, 4E:
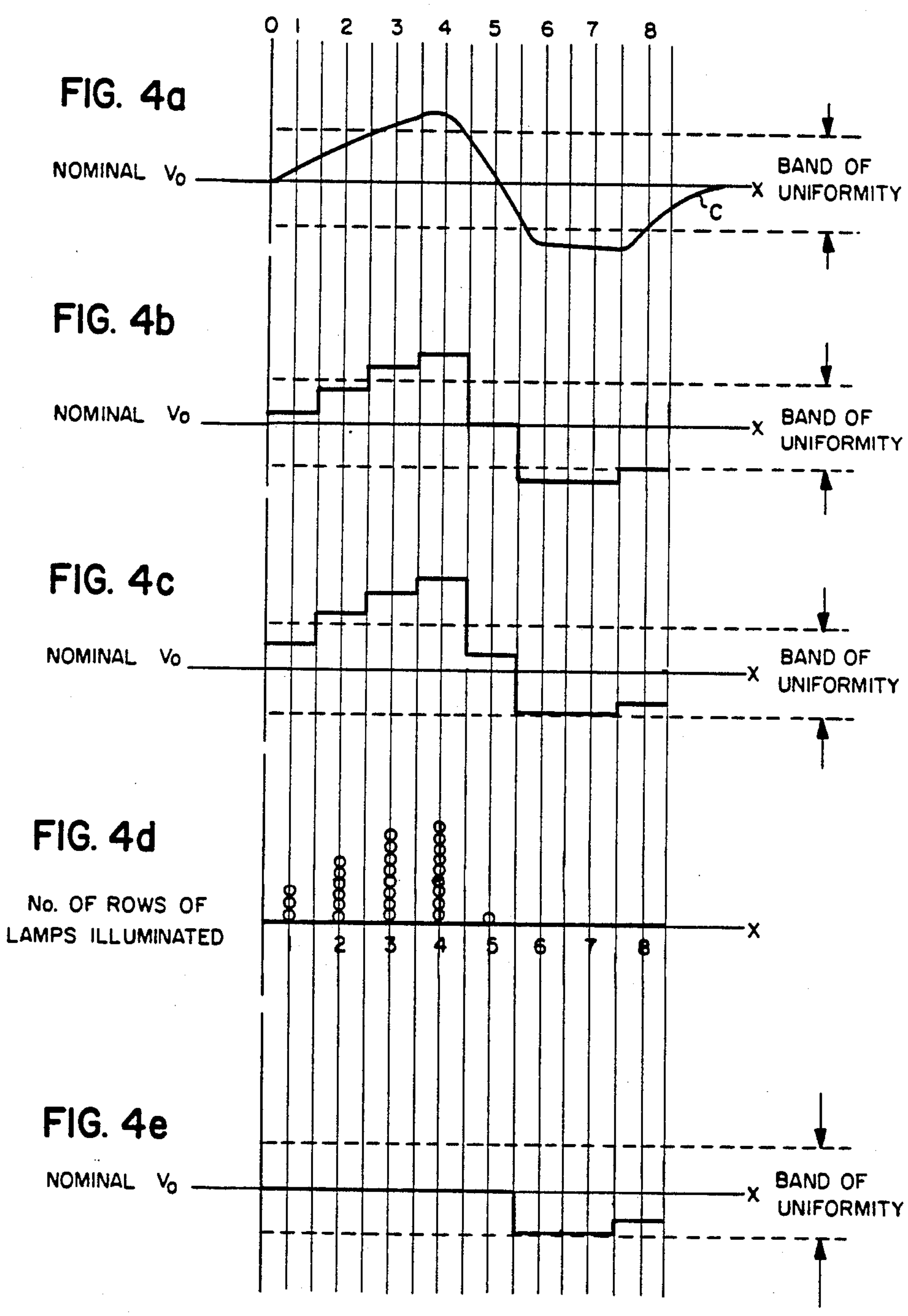
FIGS. 4*a–c* and e present a hypothetical example of charge level readings across a photoconductor and are provided to facilitate understanding of the apparatus and method of the invention.
FIG. 4*d* presents a graph representing illuminating of lamps in accordance with the hypothetical example.

The apparatus shown in FIG. 2 will be described with reference to the hypothetical example shown in FIGS. 4*a–e*. In FIG. 4*a*, there is shown represented by a straight line a nominal or desired charge level $V_o$ for the photoconductor of say −550 volts. In the transverse direction "X", the actual $V_o$ in this example is shown in curve "C" to have some variability about this nominal level due to nonuniformity of charging for the reasons set forth above. A certain amount of variability from $V_o$, say ±10 volts, is acceptable in this example, and this is labeled as the Band of Uniformity. To simplify matters, discussion of charge level will be in terms of absolute value of magnitude, thus a charge level of −550 volts is considered herein higher than a charge level of −540 volts. Depending on the circumstances, the band may be wider or narrower and perhaps even of no width so that the higher and lower levels are identical with nominal $V_o$.

It will be noted that certain portions of the photoconductor have charge levels that are outside this band. In accordance with the invention, the charger 20 and the light sources 56 are adjusted to vary the charge levels on the photoconductor 16 so that they are within the range of the preferred Band of Uniformity. See FIG. 4*e*.

Before the copier/duplicator is placed in a reproduction mode, once or twice a day or more frequently if necessary a calibration operation is taken to ensure that the actual charge levels $V_o$ are within the Band of Uniformity. In this calibration, adjustments are made to the charger 20 and the light sources 56 in the manner to be described. After calibration, the copier/duplicator apparatus can be operated in the reproduction mode to produce production runs of copies. To start the calibration, an operator depresses a switch 45 which provides an interrupt signal to the microcomputer 47, which will be understood to also control the operation of the copier/duplicator apparatus 10. Prior to depressing the switch 45, a signal $V_1$ has been provided during the normal machine start-up to a summing port 48 which sets the low voltage control grid power supply 49 to adjust the charger 20 so that it will produce a nominal charge level $V_o$ of say −550 volts. As shown in FIG. 4*a*, the actual $V_o$ as deposited on the photoconductor varies from the nominal level. Grid control programmable power supplies are well known in the art and are disclosed, for example, in U.S. Pat. No. 4,166,690 and also U.S. Pat. No. 4,294,536.

Figure 5:
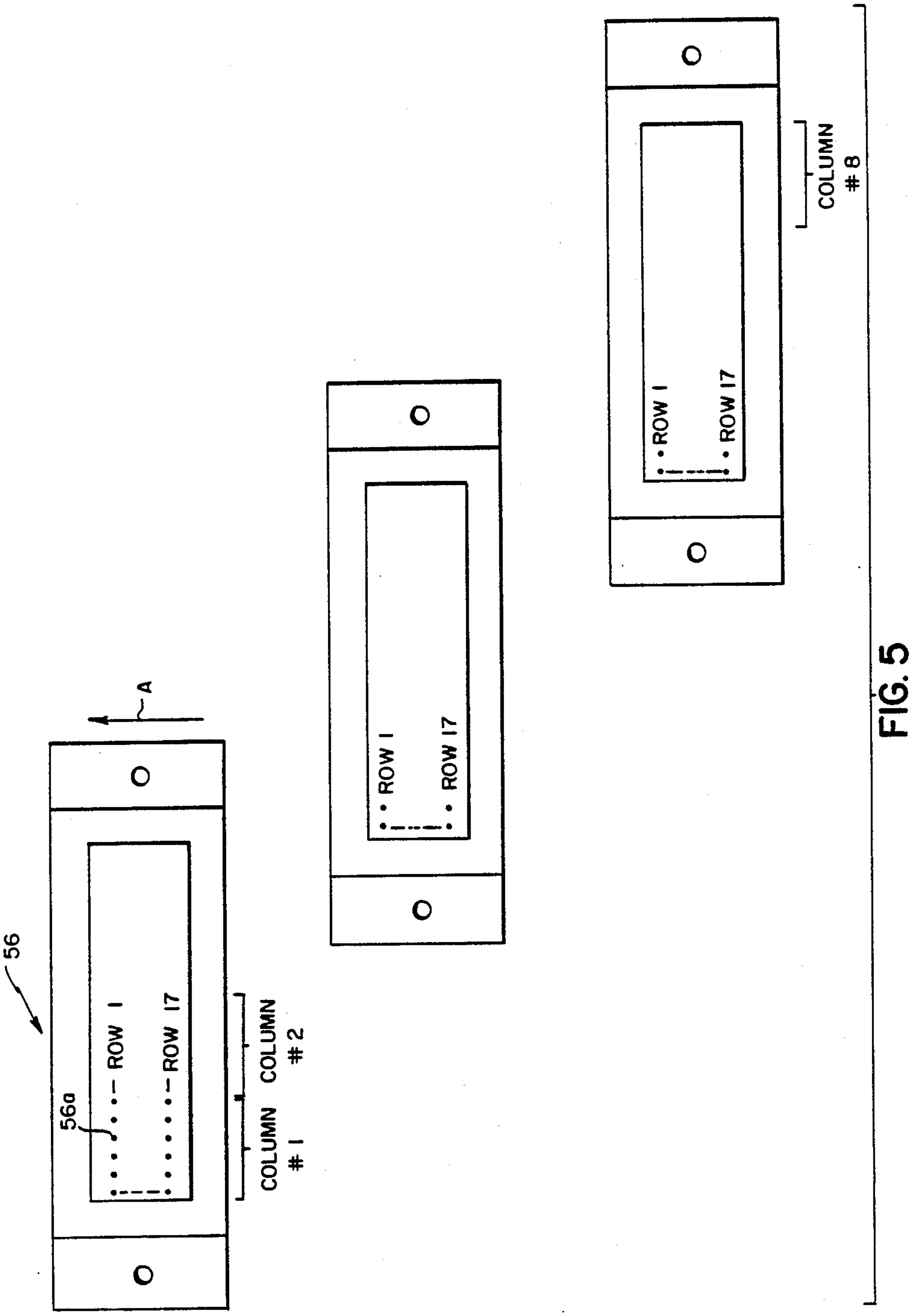
FIG. 5 is a schematic of an arrangement of banks of lamps that may be used in accordance with the invention.

In the calibration mode, the microcomputer 47 provides a series of pulse-type commands to the motor 54. The motor 54 is then energized to move the electrometer probe 50*b* in the transverse direction across the web 16. As indicated in FIG. 4*b*, for a specific example, there are eight transverse locations on the photoconductor for say an image area about 35 cm wide. At each location (as determined by the number of pulses sent to the motor), the microprocessor activates analog/digital converter 57 which provides a digital representation of the charge level at a particular transverse location as an input to a memory associated with the microcomputer where it is stored in a predetermined one of eight locations. Preferably the electrometer remains at each location for a time sufficient for the photoconductor to complete one full revolution past the electrometer. This permits the electrometer to provide an averaged reading for that particular narrow strip portion of the photoconductor. After the first particular transverse location charge level is sensed and stored in memory, the measurements are taken for each of the next seven locations. FIG. 4*b* shows the digitized signal levels. After all eight locations have been measured and stored, the microcomputer 47 compares these digitized readings with the nominal level $V_o$ or by using the low power grid supply voltage $V_1$ which bears a known relationship to nominal $V_o$. This may be accomplished by having analog to digital converter 62 convert the analog voltage $V_1$ into digital form which is stored in the computer's memory. The value of nominal $V_o$ is then calculated or otherwise derived and compared with each of the eight measurements from the electrometer of the level of charge at each transverse location. If the level of charge at any transverse location is measured to be lower than the lower limit of the Band of Uniformity then the computer determines the minimum additional charging needed to boost the charge level at the transverse location having the lowest charge level to bring this charge level up to the minimum value for the Band. A signal, $V_2$, representative of the additional charging needed is then delivered from the digital to analog converter 64 which in response thereto provides an offset signal to the summing port 48 so as to adjust the voltage provided to the grid of the corona charger 20. Advantageously, the computer may be programmed to have electrometer probe 50*b* make one or more additional crossings until as shown in FIG. 4C, the charger is adjusted so that the lowest measured charge level is just within the lower limit of the Band of Uniformity. After the last crossing determines that the charger is suitably adjusted, the computer also has data as to whether or not the level of charge at any transverse location exceeds the upper limit of the Band. If the level of charge at any location was measured to be larger than the upper limit of the Band, then the computer determines the difference between the charge level at each location that is higher than for example the midpoint of the band or nominal $V_o$ and a signal commensurate with this difference is delivered to the lamps controller 70. The lamps controller represents a control module that is adapted to light a particular number of lamps that are associated with a particular transverse location which they directly overlie. In FIG. 5, a preferred arrangement of banks of lamps is shown that comprises three panel displays that are mounted so as to be staggered as shown with the direction of movement of the photoconductor indicated by the arrow A so that taken together their active areas span the width of the photoconductor 16. The displays each have 17 rows with each row having 192 gas plasma display lamps 56*a*. Of the 17 rows of display lamps in each column there will be selected lamps that may be illuminated to erase charge from a respective transverse location on the photoconductor and over which the column lies. For example, one or more of the lamps in row 1, column 1, may be illuminated to remove a small overcharge (over nominal $V_o$) from the first transverse location on the photoconductor. Should greater overcharge be present at this location more than one and up to 17 rows of lamps in column #1 may have its respective lamps illuminated to reduce the charge to nominal $V_o$. Each of the transverse locations on the photoconductor of which a measurement is made of charge level has a respective group of lamps associated with a designated column, and one or more of these lamps may be illuminated row by row to reduce charge in the associated transverse photoconductor location for the respective column of lamps. Since the illumination from the lamps tends to flare out, it is desirous to avoid illuminating lamps adjacent the ends of each column to avoid light from lamps in one column affecting adjacent locations. Thus preferably only those lights near the middle of the column need be used and their tendency to flare out is used to substantially cover the width of their respective location. The level of illuminating emitted by each lamp is desirably preset to provide fine control over the charge-reducing effect of each lamp. Thus filters may be placed in front of the lamps and/or the current regulated thereto so that each lamp erases only a small amount of charge.

Returning now to the example shown in FIG. 4, the lamps controller 70 in response to the signal from the computer illuminates the number of rows of lamps in each column that are needed to reduce the charge at each location to nominal $V_o$. Thus, the charge at each location that is overcharged is reduced differentially in accordance with the difference between charge level measured at such location and a reference value which in this case is the nominal value $V_o$. The reference value could also be the upper boundary of the Band of Uniformity.

Figure 3:
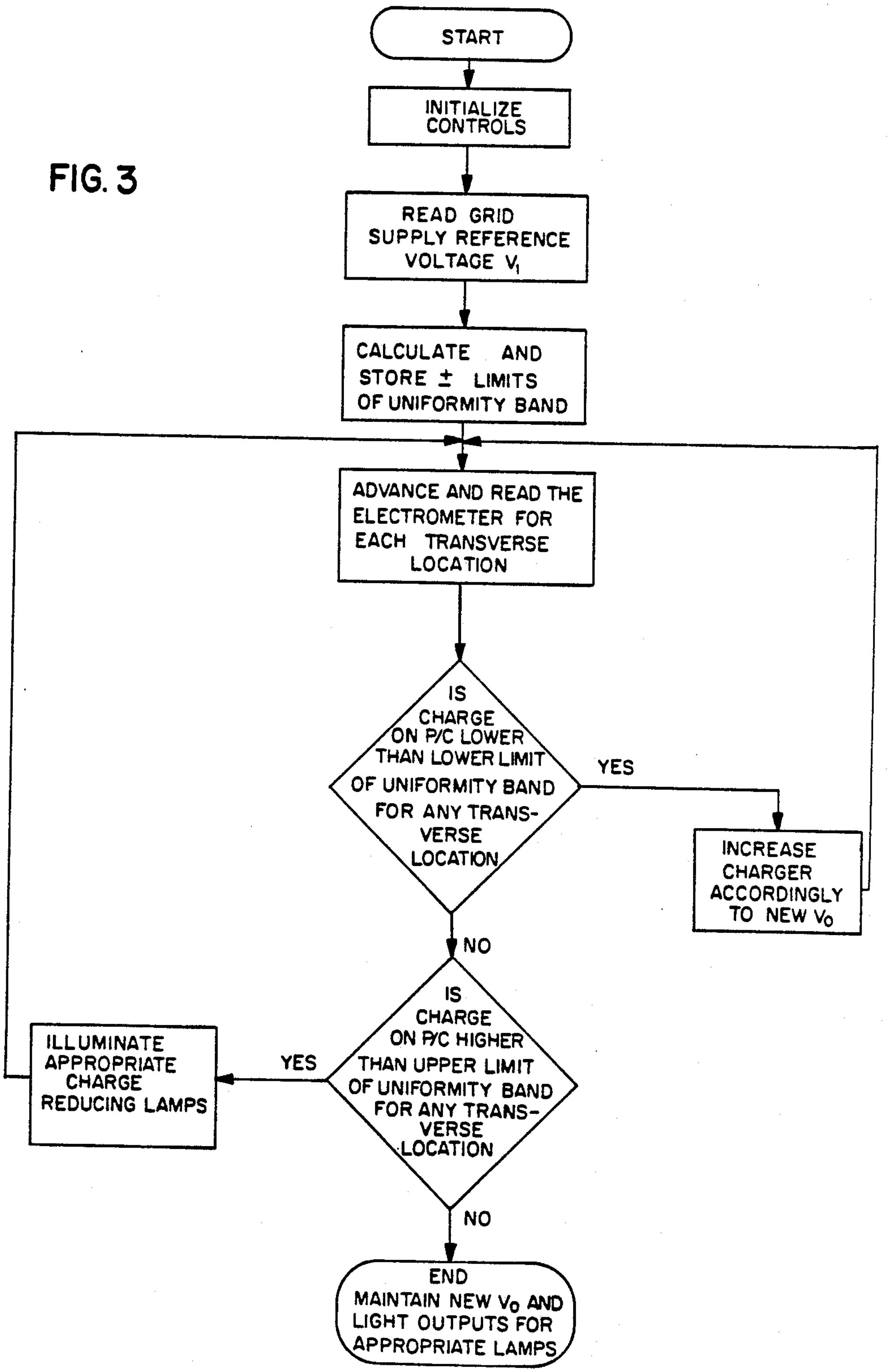
FIG. 3 is a flow chart illustrating the sequence of operations used by a control system for controlling the portion of the copier shown in FIG. 2.

As shown in FIG. 4d, only those lamps which correspond to transverse locations on the photoconductor that are higher than the nominal level $V_o$ are illuminated, and only in numbers of rows selected to reduce the charge at the corresponding transverse photoconductor location to the nominal $V_o$ level. After the corresponding lamps are illuminated, an additional measurement is taken by the electrometer of each of the transverse locations on the photoconductor and each measurement is again compared with nominal $V_o$ to ensure that no locations have measured charge levels greater than nominal $V_o$. Should any still have greater charge levels, the computer, based on these new measurements, will signal the lamps controller to increase the number of rows of lamps illuminated for the respective transverse location. As shown in FIG. 4e, the charger is adjusted so that the lowest measured charge level is just within the lower limit of the Band of Uniformity and, with the proper erase lamps on, all the transverse locations on the photoconductor are within the Band of Uniformity. Now that the charging system is calibrated, it may be used in the reproduction mode with the appropriate charge erase lamps illuminated and with the charger properly adjusted. As may be noted from FIG. 3, the process of having the electrometer make a reading and then adjust the charger or the charge-reducing lamps is an iterative one. That is the cycle of measuring and adjusting of the charger or the lamps repeats based on the last taken measurements until the desired results are obtained.

If desired, the charger may be initially adjusted so that it would overcharge the photoconductor and thus it would be unlikely ever to have any transverse locations lower than the minimum value of the band. In such instance, controls for providing an offset would be unnecessary and only controls directed towards erasing charge would be useful.

While one moving electrometer is shown in the discussion of the preferred embodiment it will be appreciated that a plurality of stationary electrometers may be provided and arranged across the width of the photoconductor and appropriate circuitry provided for taking their respective readings in a timed sequence.

Figure 6:
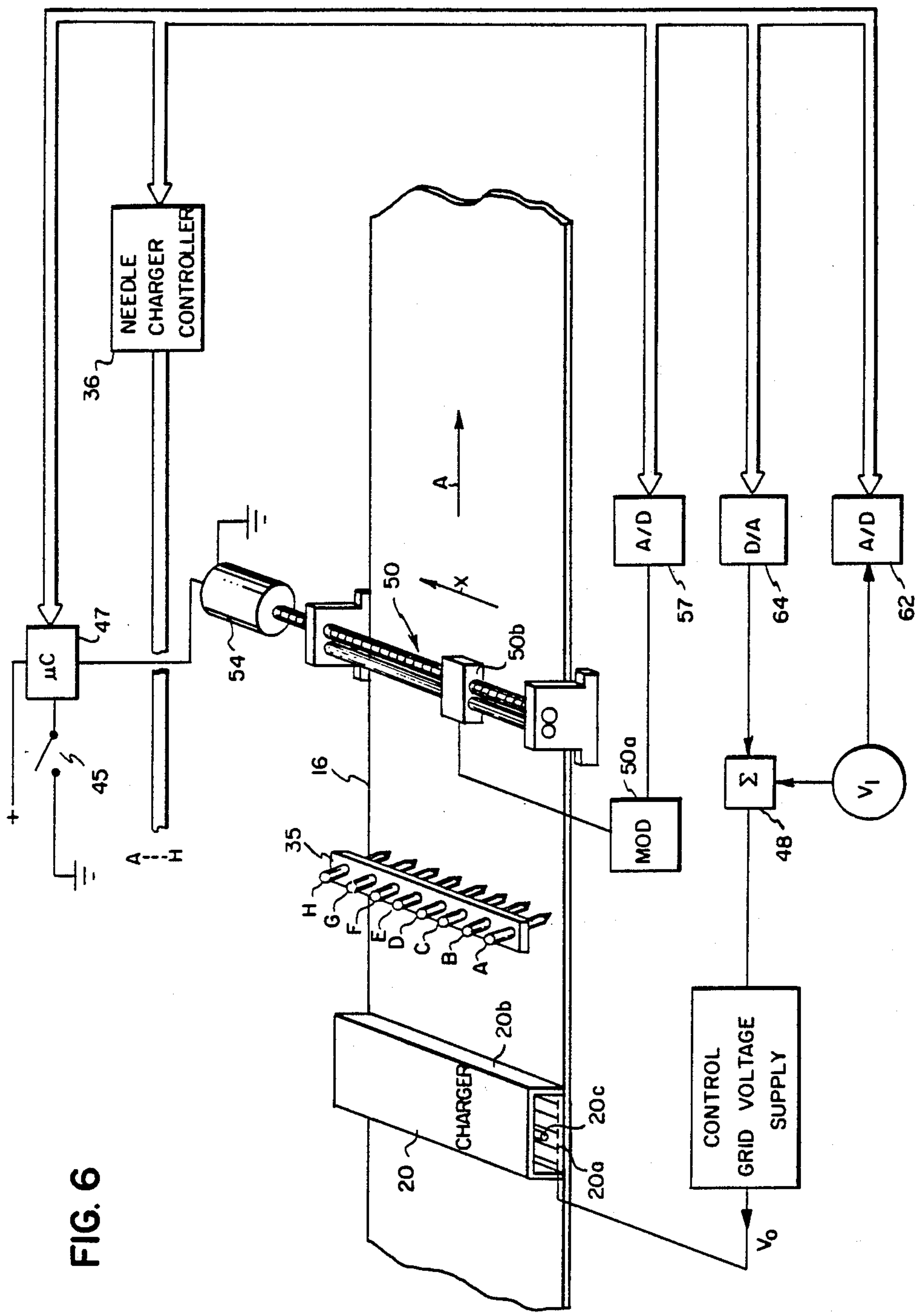
FIG. 6 is a view similar to that of FIG. 2 but showing another embodiment of the invention.
Figure 7:
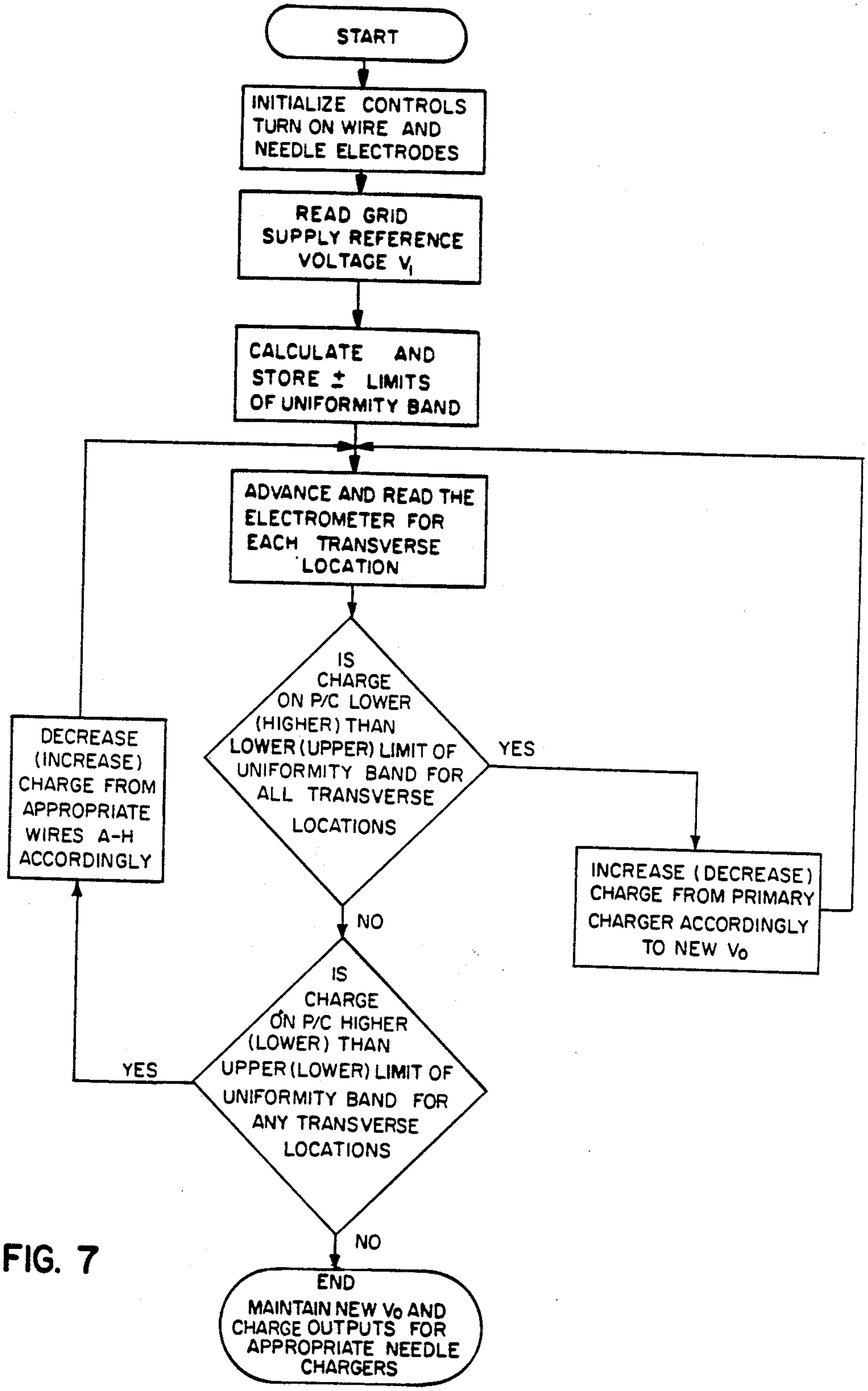
FIG. 7 is a flow chart illustrating the sequence of operations used by a control system for controlling the portion of the copier shown in FIG. 6.

Reference will now be made to a second embodiment of the invention shown in FIGS. 6 and 7. In this embodiment, elements identical to that described with regard to the first embodiment of the invention are identified with the same indicia. Since these identical elements function in the same way as described previously discussion with regard to this embodiment need only be directed toward differences in the operation of this embodiment vis-a-vis that for the first embodiment. In the second embodiment a needle charging station 35 is substituted for the charge erase lamps of the embodiment of FIG. 1. At charging station 35 a plurality of rigid needle-like charging elements A–H are arranged transverse to the direction of movement A of photoconductor 16. During a calibration phase of the apparatus both primary charger 20 and needle chargers A–H are turned on so that these charging elements are emitting corona current. In this embodiment both charging stations are emitting negative corona current onto the photoconductor. The electrometer probe 50a is then moved in the direction X across the photoconductor and measures the charge level at each of eight locations across the width of the photoconductor. The electrometer module 50b then feeds these analog signals to an A/D converter 57 which in turn delivers digitized values of these signals to microcomputer 47. In addition to storing these values, the microcomputer has also stored in memory the grid supply reference voltage $V_1$ and has calculated the limits of the desired uniformity band. With reference now to FIG. 7, if the readings by the electrometer 50 indicate that all locations have a charge level lower (or higher) than the lower (or upper) level of the uniformity band then the charge output of the primary charging station 20 is increased (or decreased) by providing a signal to summing port 48 which combines with signal $V_1$ to increase (or decrease) the grid voltage $V_o$. The electrometer again takes a measurement at each of the 8 locations to determine if all of the locations have a charge level lower (or higher) than the lower (or upper) level of the uniformity band. The above is repeated iteratively until this condition is met. When this condition is met the microcomputer next determines what additional charging is needed from the needle chargers to have all the transverse locations be at charge levels falling within the desired uniformity band. Each of the charging needles is adjusted selectively with regard to the respective transverse reading by the electrometer. After successive additional readings by the electrometer with iterative adjustment of the voltage on the needle chargers 35 the charge levels at the respective locations beneath the needle chargers will be brought to levels within the desired uniformity band. A needle charger controller 36 coupled to the microcomputer stores the determined voltage setting for each charging needle A through H and maintains this setting during the reproduction mode of the copier. While this embodiment has been described with reference to 8 charging needles one for each of the measured transverse locations it will be appreciated that many more needles may be located across the width of the photoconductor and grouped together so that say 4 needles are electrically at the same potential and used to adjust the charge at each of the eight transverse locations. This may be desirable since the effect of each needle is limited to adding a charge along a narrow band beneath the needle and there could be a need for say 4 of these bands to equal the width of each band comprising a transverse location.

The effect of the charge-adjusting means, items 56 and 35, described in the first and second embodiments are to selectively adjust the non-uniform charging by the corona charging station 20 to provide a resultant generally uniform charge upon the photoconductor. Thus, in the embodiments described above, a generally uniform electrostatic charge was formed over the area upon which an electrophotographic image is to be made by the selective enablement of either charge-reducing means or charge-increasing means. The invention further comtemplates that since in the context of electrophotography charge-reducing means as described herein and image exposure means both involve the use of light that an equivalent is considered to be the use of a charge-reducing means during the exposure operation. For example, where imaging exposure is made through use of a scanning beam the intensity of the beam or the duration of time spent at any "point" may be adjusted in accordance with information derived from the electrometer as well as from the source of image information.

In this regard, reference will now be made to FIGS. 8 and 9 wherein an electrophotographic apparatus is shown having a scanning exposure system. Items indicated with a prime (') in these figures correspond to similarly numbered items shown in FIGS. 1 and 2 which have similar functions. In this embodiment a photoconductor 16', illustratively shown mounted on a drum, rotates past and is charged by a charging station 20' having a negative corona current discharge device and grid suitably spaced from the photoconductor. An exposure station, more fully described below, has an exposure beam 80 reflected from a rotating polygon 81. The beam suitably image-wise modulated traverses the scan width of the photoconductor in synchronism with the drum to form an electrostatic image on the photoconductor. The photoconductor then passes through a conventional development station 84 which may be of the cascade type shown or of the type illustrated in FIG. 1. This station causes toner particles to adhere to portions of the photoconductor not sufficiently discharged by the exposure beam to develop the latent image. The developed image is then transferred to a web of copy paper that is passed in contact with the photoconductor. The copy paper receives charge from an electrostatic discharger 86 to induce transfer of the developed image from the photoconductor to the copy paper. The copy paper is supplied from a supply reel 88, passes around guide rollers 90 and is advanced by drive rollers 92 into receiving bin 94. A fusing device 93 fixes the images to the copy paper as it passes into bin 94.

Usable images are provided in that the information content of the scanning spot is represented by the modulated or variant intensity of light respective to its position within the scan width. As the spot traverses, the charged surface of the photoconductor through a given scan angle, the spot dissipates the electrostatic charge in accordance with its light intensity. The electrostatic charge pattern thus produced is developed and then transferred to the copy paper as described above. The photoconductor is then cleaned by a cleaning device 98 before being recharged by charging device 20' for the next copy cycle. The polygon 81 is continuously driven by motor 100 and synchronized in rotation to a synchronization signal representative of the scan rate used to obtain an original video signal which signal may be stored in binary form in a binary storage device indicated by the device 95 labeled "Page Storage" in FIG. 9.

The beam is also modulated by a signal stored in binary form in a storage device 91 labeled "Charge Uniformity to Beam Intensity Correction" and representing charge control information. This information is derived by an electrometer 50' which includes probe 50b' that traverses the width of the photoconductor and at specific transverse locations of the photoconductor provides readings of the voltage levels of the photoconductor which has been charged by the charger 20'. As indicated for the embodiment described in FIGS. 1 and 2, the microcomputer 47' may be programmed to cause the electrometer to make these readings during a warm-up period of the copier or at fixed times during the day when the copier is not otherwise in a copy mode. The readings of the probe 50b' are detected by the electrometer module 50a' and converted from an analog signal to a digital signal by converter 57'. The microcomputer 47' then determines if there are any locations which have charge levels lower than the lower limit of the Band of Uniformity as discussed previously for the embodiment of FIGS. 1 and 2. If additional charging is required, the grid voltage supply 49' is adjusted until the repeated measurements by the electrometer determine that all transverse locations are charged to at least the lower limit of the Band of Uniformity. The last set of measurements used in calibrating the charger are then used by the computer to calculate adjustments to the intensity of the exposure beam for those of the eight locations requiring compensation for having extra charge being present thereon. These adjustments are stored in digital form in the storage device 91. As may be noted in FIG. 9, a signal representing the optical information from the Page Storage device 95 is combined in a multiplier 96 with a signal representing charge adjustments. The resulting signal is then converted to an analog signal by digital to analog converter 97 and the analog signal is coupled to acousto-optic modulator 99 to modulate a beam that is focused by beam forming optics 105 onto the modulator. The source of the beam may comprise, for example, a helium-neon laser source 106. The zero order non-diffracted beam is absorbed by a beam stop and the diffracted first order beam which is modulated with both optical and charge control information is passed through a beam expander 101 a filter 102 and reflected from polygon 81 through field flattening optics 107 onto photoconductor 16'. A light sensor 108 is located adjacent one edge of the photoconductor and senses light reflected from polygon 81 at the start of each page line. A signal from this sensor and a signal from a shaft encoder 103, which detects the drum's rotational position, are fed to the microcomputer 47' and used to synchronize movement of the drum with the scan exposure.

In the embodiment just described, the laser beam is modulated for each scan line at numerous discrete points across the width of the photoconductor. For each such point, the modulation will involve an input comprising both optical information and charge control information. If necessary, the charge control information signal may be modified to correct for other factors such as variations in facet reflectivity of the polygon 81. When reproducing white background areas of an original document, the modulated beam will be of such intensity defined herein as full exposure intensity that it will reduce the level of charge on corresponding areas of the photoconductor to a level below which will cause no toner to adhere to such areas of the photoconductor. Areas of the photoconductor corresponding to image information will be suitably either not discharged or have its charge modified in accordance with signals from the "Page Storage" and "Charge Uniformity to Beam Intensity Correction" devices so that the charge in these areas form a latent electrostatic image that will be developed when passed through the developer station 84. The signals from the "Charge Uniformity to Beam Intensity Correction" device will be related to the difference in charge between the charge level sensed by the electrometer 50' at the particular location and the desired level of charging as exemplified by a predetermined "Band of Uniformity" whose values are stored in the microcomputer's memory.

In general, exposure of a photoconductor with a laser beam can be conducted in the following fashion during a point-by-point scan of a photoconductor to provide contrast in a finished print. Light areas in the print are made by providing full exposure of many or all the points in the corresponding areas of the photoconductor; grey areas can be made by providing full exposure of only some points in the corresponding areas of the photoconductor or more preferably by providing a suitable amount of exposure for each point commensurate with the density desired in the final print; and black areas are made by providing no exposure of points in the corresponding areas of the photoconductor. Since full exposure of any point on the photoconductor by a scanning laser beam can result in its charge level being reduced to a level below which no toner will tend to adhere thereto, it is normally of no concern that the initial charge on that point is higher or lower than nominal $V_o$. What is important is that points in the image area which would receive no or little image light should be charged to $V_o$ so that they develop appropriately. Also important is that points in the image area which correspond to grey areas of the print and which are to be charged to voltage levels less than $V_o$ in accordance with desired density for such areas should have their charge levels modified in accordance with both density-image information and charge correcting information. With the above in mind, the multiplier may be constructed so that at each point where full exposure is called for by information stored in the Page Storage device the multiplier provides a signal representing this information to converter 96 and AOM 99 and suppresses the charge correction information. At each point where exposure is not called for by the Page Storage device the multiplier provides the charge correction information signal to cause modulation of the laser beam to a level less than its full exposure level to adjust charge levels at such points on the photoconductor to levels within the Band of Uniformity. At points where some but less than full exposure is called for by the Page Storage Device, the multiplier combines both the Page Storage Device information signals and Charge Correction Device information signals to cause modulation of the laser beam to levels appropriate for the densities desired at such points.

Many of the causes of charge non-uniformities are time dependent. Therefore, it is quite possible that the illumination profile determined at the beginning of the day may not be appropriate for the desired uniformity at the end of the day. A number of control algorithms can be used to have the copier/duplicator enter the calibration mode automatically from the reproduction mode. For example, depending on the magnitude of the nonuniformity that the copier/duplicator can tolerate, the calibration mode can be entered once a day, twice a day, and so on without the need for the operator to initiate the calibration mode. For example, the calibration mode may be entered automatically during a copier's warm-up period or between the start of a job and the first copy.

Figure 10:
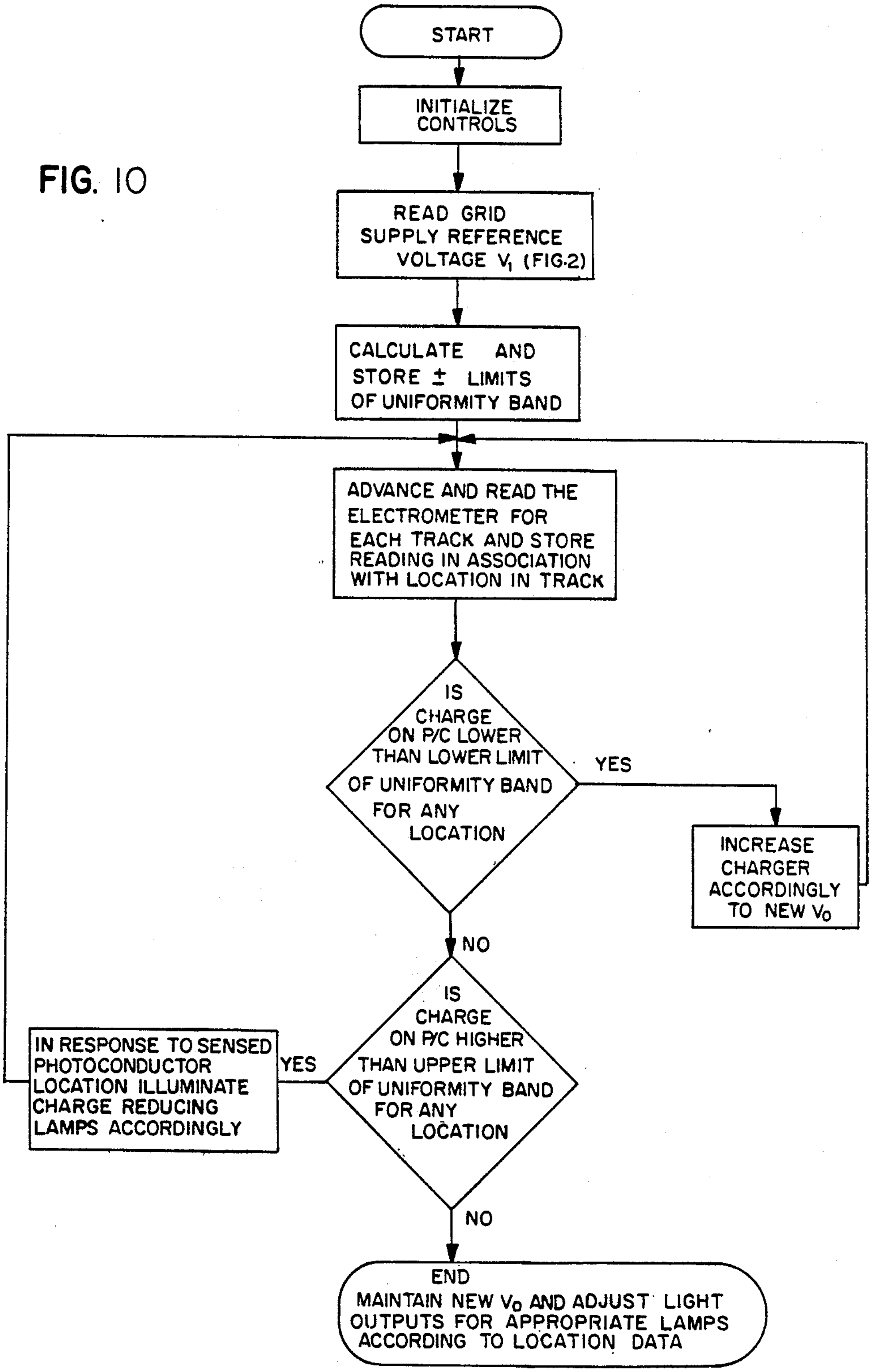
FIG. 10 is a flow chart illustrating the sequence of operations used by a control system operating in accordance with still another embodiment of the invention.

In the description heretofore provided, information regarding the charge level for a particular transverse location, narrow strip or track is determined by obtaining an average reading for the track and making adjustments accordingly. This is to overcome the problem of nonuniformity of output in the cross-track direction of negative corona charging devices. As is also mentioned above, the invention is capable of correcting for other sources contributing to nonuniformities. One other source of nonuniformity is in the photoconductor itself. For example, a photoconductive drum may be out of round or a photoconductive web or drum may have a localized thin coating that provides a periodically recurring nonuniformity in the longitudinally direction of photoconductor movement or an in-track nonuniformity in addition to possible cross-track nonuniformities due to the charger. The in-track nonuniformity may also be detected during the calibration mode. The computer 47 (FIG. 2) may be programmed to recognize segments of the track having consistently significantly higher or lower than average readings for a track where each of the say eight tracks of the photoconductor makes several revolutions past the electrometer sensor 50*b*. The computer may do this by comparing each reading within a track with the average value calculated for the track and determining the location of points that meet a fixed criterion for being significantly and consistently higher or lower than average. The information concerning location may be provided by sensing position indicia formed in the photoconductor or associated therewith. Alternatively, rather than comparing with an average, readings of all points within a track may be compared with the limits of the Band of Uniformity and correction accomplished to adjust each reading so that the location is corrected accordingly; see FIG. 10. For example and with reference to FIG. 2, it is known to provide perforations in web-type photoconductors along the edges thereof that may be detected by a conventional perforation sensor 120 and signals therefrom counted and used to synchronize operations or locate a portion of a photoconductor in accordance with such count. Other means may include encoders having optical or magnetically sensed indicia. Typically, this count would be from a predetermined starting point or reference which may comprise one or more larger perforations on the photoconductor. With the information now determined and stored in memory by the computer as to the particular correction for each location within a track requiring same, the computer 47 controls the lamps controller 70 in accordance with the scheme recited previously and adjusts the output of the charge erase lamps 56 in accordance with the correction data stored in memory. During the calibration mode, the lamps controller may make the necessary corrections and additional readings can be taken with adjustments to provide an iterative process for providg a uniform charge on the photoconductor.

Where the outputs of the charge erase lamps are well controllable, then correction may be provided for in response to measurements made during the actual production run. For example, a series of electrometers may be located across the direction of travel of the photoconductor with each electrometer dedicated to read the charge on one-track or longitudinal narrow strip. These electrometers would be immediately downstream of the primary charger 20. The charge erase lamps 56 would be located immediately downstream of the electrometers. As the measurements determined by signals from the electrometers indicate the need for corrections, the computer 47 selectively enables the charge erase lamps to lower the charge at each location to within the band of uniformity. Using this arrangement reduces the need for the computer to store large amounts of data representing correction data for all locations on the photoconductor.

Figure 8:
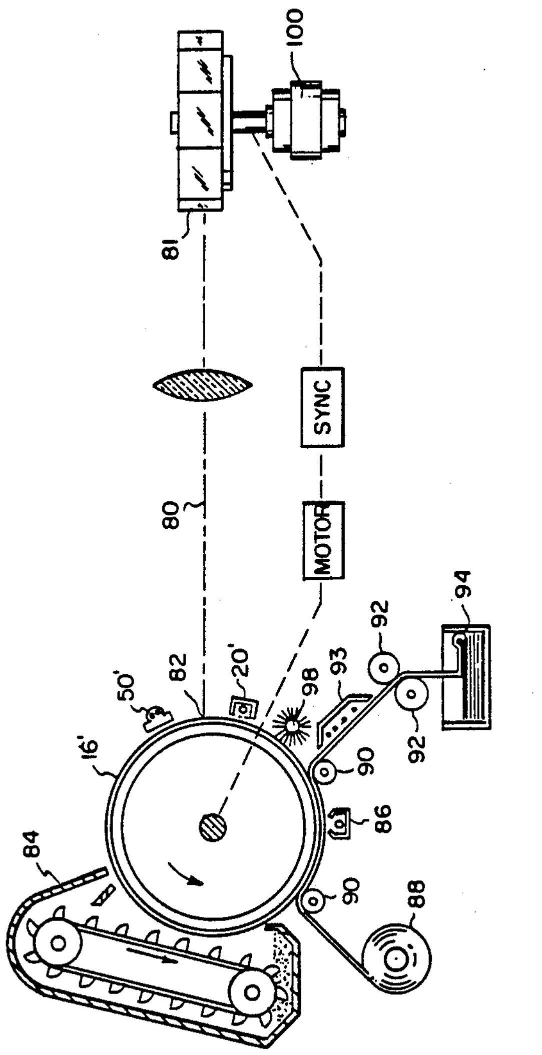
FIG. 8 is a side elevation view in schematic form of still another embodiment of the invention.
Figure 9:
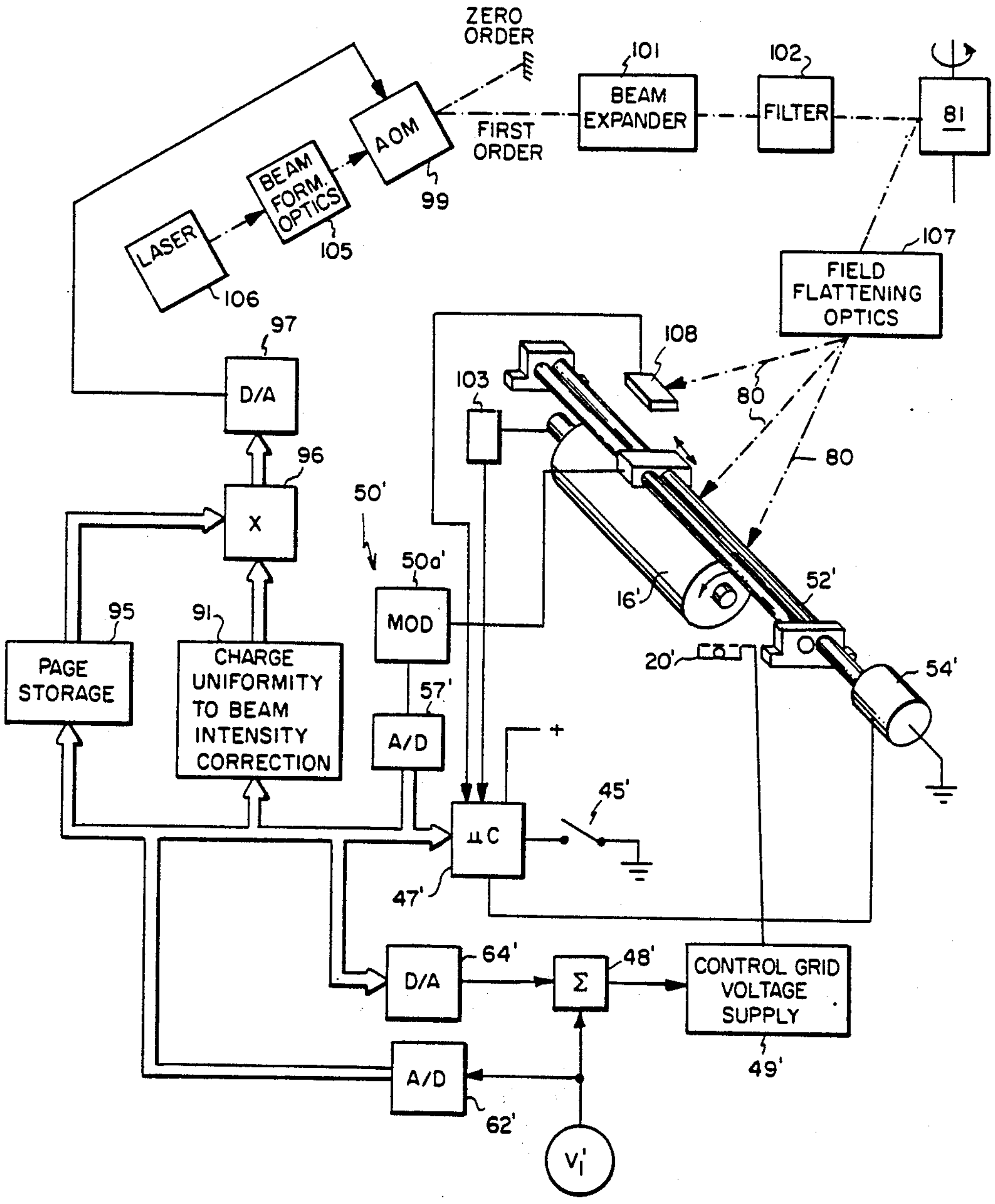
FIG. 9 is a schematic showing additional details of elements forming a charge control means for the embodiment of FIG. 8.

With reference now to the embodiment of FIGS. 8 and 9, the modification suggested herein are also applicable to this embodiment to provide different corrections in-track as well as cross-track and thus provide for an improved scheme for correction. In this regard, shaft encoder 103 provides position indicia to the computer 47' during each in-track reading by electrometer 50' and the data for correcting for in-track nonuniformities is stored in storage device 91. In this way, the exposure beam is modulated not only with information for correcting for cross-track nonuniformities, but also in-track nonuniformities.

Still other modifications include the use of a densitometer to read density of developed test images to detect consistent nonuniformities due not only to charging but also due to development, e.g., uneven development brush gap.

The invention has been described in detail with particular reference to the preferred embodiment thereof, but it will be understood that variations and modifications can be effected within the spirit and scope of the invention.

I claim:

1. In an electrophotographic reproduction apparatus including a member having a surface upon which an electrostatic latent image may be formed; means for charging the surface with an electrostatic charge; means for moving the surface relative to the charging means in a first direction; exposure means for exposing the charged surface to image-bearing radiation to form the latent image; measuring means for measuring the level of charge deposited on the surface by said charging means and charge-reducing means for reducing the level of charge on the surface to a referenced level, the improvement which comprises:

first means for controlling the measuring means to cause the measuring means to measure the level of charge at each of a plural number of locations lying across the surface in a second direction transverse to the first direction and to provide a signal commensurate with each such measurement; and second means responsive to signals from the measuring means for controlling the charge-reducing means to selectively reduce the charge level at each of those transverse locations having a level of charge greater than said referenced level in accordance with the difference in charge level measurement for each such transverse location and the referenced level.

2. The apparatus according to claim 1 wherein the first means causes the measuring means to again measure the level of charge at each of the plural number of locations to check the results of operation of the charge-reducing means and if the level of charge at any location is greater than the referenced level the second means again adjusts the charge-reducing means based on the second measurements to selectively reduce the charge level at each of those locations having a level of charge greater than the referenced level and wherein the first means and the second means are operated iteratively until the charge level at each of the locations is no higher than the referenced level.

3. The apparatus according to claim 2 wherein the charging means deposits a negative electrostatic charge on the surface.

4. The apparatus according to claim 1 wherein the surface includes an area upon which the electrostatic latent image is to be formed; and includes third means responsive to measurement by the measuring means of a charge level lower than a referenced minimum level, for adjusting the charging means to increase the level of charge on the area so that all portions thereof in the area have a level of charge greater than the referenced minimum level.

5. The apparatus according to claim 4 wherein the first means causes the measuring means to again measure the level of charge at each of the plural number of locations to check the results of operation of the charging means and if the level of charge at any location is measured to be lower than the referenced minimum level the third means again adjusts the charging means based on these second measurements to increase the level of charge on the area so that all portions thereof in the area have a level of charge greater than the referenced minimum level and wherein the first means and the third means are operated iteratively until the charge level at each of the locations is greater than the referenced minimum level.

6. The apparatus according to claim 5 wherein the charging means deposits a negative electrostatic charge on the surface.

7. The apparatus according to claim 1 and wherein the surface is a photoconductive surface and the charge-reducing means comprises light source means for providing exposure of said photoconductor to nonimaging light at locations and in amounts needed to reduce the charge selectively at each of the locations to the aforesaid refereneced level.

8. The apparatus according to claim 7 wherein the surface includes an area upon which the electrostatic latent image is to be formed; and includes third means responsive to measurement by the measuring means of a charge level lower than a referenced minimum level, for adjusting the charging means to increase the level of charge on the area so that all portions thereof have a level of charge greater than the referenced minimum level.

9. The apparatus according to claim 8 and wherein the charging means deposits a negative electrostatic charge on the surface.

10. The apparatus according to claim 7 and wherein the light source means comprises a bank of lamps arranged in rows, extending in the second direction, and in columns, extending in the first direction, and each column of lamps is associated with the overlies a specific transverse location on the photoconductor, and wherein the second means selectively controls the number of rows of lamps which will be illuminated in each column in response to the level of charge measured by the measuring means for the respective transverse location.

11. The apparatus according to claim 10 wherein the first means causes the measuring means to again measure the level of charge at each of the plural number of locations to check the results of operation of the charge-reducing means and if the level of charge at any location is measured to be greater than the referenced level the second means again adjusts the charge-reducing means based on these second measurements to selectively reduce the charge level at each of those locations having a level of charge greater than the referenced level and wherein the first means and the second means are operated iteratively until the charge level at each of the locations is no higher than the referenced level.

12. The apparatus according to claim 11 wherein the charging means deposits a negative electrostatic charge on the surface.

13. The apparatus according to claim 12 wherein the surface includes an area upon which the electrostatic latent image is to be formed; and includes third means responsive to measurement by the measuring means of a charge level lower than a referenced minimum level for adjusting the charging means to increase the level of charge on the area so that all portions thereof have a level of charge greater than the referenced minimum level.

14. The apparatus according to claim 13 wherein the first means causes the measuring means to again measure the level of charge at each of the plural number of locations to check the results of operation of the charging means and if the level of charge at any location is measured to be lower than the referenced minimum level the third means again adjusts the charge-reducing means based on these second measurements to increase the level of charge on the area so that all portions thereof in the area have a level of charge greater than the referenced minimum level and wherein the first means and the third means are operated iteratively until the charge level at each of the locations is greater than the referenced minimum level.

15. The apparatus according to claim 1 and wherein the charging means deposits a negative electrostatic charge on the surface.

16. In an electrophotographic reproduction apparatus including a photoconductor; a corona charging station for charging an image area of the photoconductor with an electrostatic charge of a level suitable for forming an electrostatic latent image; means for moving the photoconductor in a first direction past said charging station; an exposure station located downstream of the charging station for illuminating the image area of the photoconductor with image-bearing radiation to form a latent electrostatic image in the area; a developing station for developing the latent image; a transfer station for transferring the developed image to a receiver; measuring means for measuring the level of charge deposited by said charging means and charge-reducing means for reducing the level of charge on the surface to a referenced maximum level; the improvement which comprises:

first means for controlling the measuring means to cause the measuring means to measure the level of charge at each of a plural number of transverse locations lying across the photoconductor in a second direction transverse to the first direction; and second means responsive to the measurement by the measuring means of a charge level lower than a referenced minimum level at any of the measured locations for increasing the level of charge at all locations in the area to the referenced minimum level; and third means responsive to the measuring means for controlling the charge-reducing means to selectively reduce, in accordance with the difference in charge level measurement for each such transverse location and a referenced level, the charge level at each of those transverse locations having a level of charge greater than said maximum level to a level falling within the range between the aforesaid referenced minimum and maximum levels.

17. The apparatus according to claim 16 and wherein the corona charging station deposits a negative electrostatic charge on the surface.

18. The apparatus according to claim 17 and wherein the charge-reducing means comprises light source means for providing exposure of said photoconductor to nonimaging light at locations and in amounts needed to reduce the charge levels selectively at the locations to a level falling within the range between the referenced minimum and maximum levels.

19. The apparatus according to claim 18 and wherein the light source means comprises a bank of lamps arranged in rows, extending in the second direction, and in columns, extending in the first direction, and each column of lamps is associated with and overlies a specific transverse location on the photoconductor and wherein the third means selectively controls the number of rows of lamps which will be illuminated in each column in response to the level of charge measured by the measuring means for the respective transverse location.

20. The apparatus according to claim 19 wherein the first means causes the measuring means to again measure the level of charge at each of the plural number of locations to check the results of operation of the charge-reducing means and if the level of charge at any location is greater than the referenced maximum level the third means again adjusts the charge-reducing means to selectively reduce the charge level at each of those locations measured to have a level of charge greater than the referenced maximum level and wherein the first means and the third means are operated iteratively until the charge level at each of the locations is measured to be no higher than the referenced maximum level.

21. The apparatus according to claim 20 and wherein the first means and the third means are operated iteratively until the charge level at each of the locations is greater than the referenced minimum level.

22. In a method for depositing an electrostatic charge on an area of a surface so that the level of charge on the surface is suitable for forming an electrostatic latent image upon exposure to image-bearing radiation, the method inculding the steps of moving the surface in a first direction past a charging station and depositing charge on the surface; measuring the level of charge deposited on the surface; adjusting the level of charge on the surface to a referenced level; and the improvement which comprises:

wherein in the step of measuring, measurements are made of the level of charge at each of a plural number of locations lying across the surface in a second direction transverse to the first direction; and wherein in the charge-adjusting step, the charge level is selectively adjusted at each of the locations having a level of charge differing from the referenced level in accordance with the charge level measurement for each such transverse location and the referenced level so as to produce a more generally uniform charge over the area.

23. The method according to claim 22 and including the steps of comparing a measured charge level for each of the locations with a referenced minimum level and adjusting the amount of charge deposited by said charging means on the area so that all points in the area have a level of charge greater than the referenced minimum level.

24. The method according to claim 23 and including the step of repeating iteratively the measuring, comparing, and charge-adjusting steps until the level of charge at each of the transverse locations is measured to be greater than the referenced minimum level.

25. The method according to claim 24 and wherein the steps of measuring and charge-adjusting are repeated iteratively until the level of charge at each transverse location is no greater than the referenced maximum level.

26. The method according to claim 23 and wherein the charging station charges the surface with a negative charge.

27. The method according to claim 22 wherein the surface is a photoconductor and the charge-adjusting step employs light to differentially reduce charge on the photoconductor.

28. The method of claim 23 and wherein measurements are made at each of a plural number of locations lying in the first direction and wherein in the charge adjusting step the charge level is selectively adjusted at each of the locations having a level of charge differing from the referenced level in accordance with the charge level measurement for such longitudinal location and the referenced level.

29. In an electrophotographic reproducing apparatus having a moving electrostatically charged member on which developable electrostatic images are formed, means for measuring the level of charge on the member and means for adjusting such level to a referenced level, the improvement which comprises:

first means for positioning said measuring means to measure the levels of charge at each of a plural number of locations on the member spaced transversely in the direction of movement of the member, and to produce a signal representative of each such level; and second means responsive to each such signal and operatively associated with said adjusting means for selectively adjusting the charge level at transverse locations having a level of charge differing from the referenced level in accordance with the difference in charge level measurement for each such transverse location and the referenced level.

30. The apparatus of claim 29 wherein the member is a photoconductor and wherein the adjusting means and second means comprise light source means for providing exposure of said photoconductor to nonimaging light at locations and in amounts needed to reduce the charge levels selectively at the locations to a level falling within the range between referenced minimum and maximum levels.

31. The apparatus of claim 29 and wherein the adjusting means and second means comprise a plurality of point charging means arranged transversely to the direction of movement of the member for providing additional corona charge current to said member at locations and in amounts needed to add charge selectively at such locations to have the resultant charge at such locations fall within a range between a referenced minimum and maximum levels.

32. In an electrophotographic reproduction apparatus for moving along a path a web capable of retaining an electrostatic charge, and including means for adjusting such charges to a reference level, the improvement comprising:

first means for detecting the levels of charge at spaced locations transverse to the direction of movement of the web and for producing signals representative of such levels; and second means responsive to such signals and operatively associated with said adjusting means for selectively adjusting the charge level, at each transverse location having a level of charge differing from the referenced level in accordance with the difference in charge level detected for each such transverse location and the referenced level.

33. The apparatus of claim 32 wherein the web is a photoconductor and wherein the charge-reducing means and second means comprise light source means for providing exposure of said photoconductor to nonimaging light at locations and in amounts needed to reduce the charge levels selectively at the locations to a level falling within the range between the referenced minimum and maximum levels.

34. The apparatus of claim 32 and wherein the adjusting means and second means comprise a plurality of point charging means arranged transversely to the direction of movement of the member for providing additional corona charge current to said web at locations and in amounts needed to add charge selectively at such locations to have the resultant charge at such locations fall within a range between a referenced minimum and maximum levels.

35. The apparatus of claim 34 wherein the corona charge current has a negative charge.

36. In an electrophotographic reproducing apparatus having an electrostatically charged photoconductive member on which developable electrostatic images are to be formed on an image area of the member, means for measuring the level of charge on the member and adjusting means for providing signals for adjusting for nonuniformities in such level to a reference level representing a maximum charge level for points in the image area, the improvement which comprises:

means for forming a narrow beam of radiation for exposure of the member on a point-by-point basis;

means for impinging the beam upon the member at selected points; and means for modulating the beam on a point-by-point basis with electrical image information signals representing an image to be formed on the member and with signals for adjusting the level of charge on the member to the reference level to form a latent electrostatic image on the member with nonuniformities of charge adjusted at points not otherwise to receive an exposure based on image information signals for such points.

37. The apparatus of claim 36 and wherein the scanning means scans the beam in point-by-point fashion across the image area of the member providing exposure at certain points in accordance with the image information signals; and the modulating means, at points on the image area of the member where no exposure is required by the image information signals, modulates the beam with signals for adjusting the level of charge on the member to the reference level.

38. The apparatus of claim 36 and including means for moving the member in a first direction and wherein the measuring means measures the levels of charge at a plural number of locations on the member spaced in a direction transverse to the first direction.

39. The apparatus of claim 38 and wherein the adjusting means and the modulating means cooperate to selectively adjust the charge level at points in transverse locations having a respective level of charge differing from the reference level in accordance with the difference in charge level measurement for each such transverse location and a referenced level.

40. The apparatus of claim 39 and including a corona charging station for charging the image area of the member with a negative electrostatic charge at least to a level suitable for forming developable electrostatic latent image.

41. In an electrophotographic reproduction apparatus including a photoconductive member having an image area upon which a developable electrostatic latent image may be formed; means for charging the image area with an electrostatic charge to a level greater than a reference level, said reference level representing a maximum nominal charge level for developing an image on the area;

means for exposing the charged area to image-bearing radiation by scanning the area in point-by-point fashion with a narrow beam of radiation modulated with imaging information to form the latent image by discharging selected points in the area to charge levels substantially lower than the reference level; the improvement which comprises:

means for modulating the beam with signals related to the difference between the level of charge applied to the member and the reference level to reduce the charge level to the reference level at points in the image area not selected for said discharging.

42. In a method for forming a developable electrostatic latent image on an image area of a photoconductive member, the method including the steps of charging the area with an electrostatic charge to a level greater than a reference level, said reference level representing a maximum nominal charge level for developing an image on the area and exposing the charged area to image-bearing radiation by scanning the area in point-by-point fashion with a narrow beam of radiation modulated with imaging information to form the image by discharging selected points in the area to charge levels substantially lower than the reference level, the improvement which comprises the step of:

modulating the beam with signals related to the difference between the level of charge applied to the area and the reference level to reduce the charge level to the reference level at points in the area not selected for said discharging.

43. In a method for forming a developable electrostatic latent image on an image area of an electrostatically charged photoconductive member, the method including the steps of measuring the level of charge on the member and adjusting the level to a predetermined reference level, said reference level representing a maximum nominal charge level for developing an image on the area, the improvement which comprises:

scanning a narrow beam of radiation on the member; and modulating the beam when scanning the member with first signals representing an image to be formed on the member and with second signals for adjusting the level of charge on the member to the reference level to form a latent electrostatic image on the member.

44. The method of claim 43 and wherein in the scanning step the beam scans in point-by-point fashion across the image area of the member providing full exposure at certain points and no or less than full exposure at other points in accordance with the first signals and wherein at points on the image area of the member where no or less than full exposure is required by the first signals the beam is modulated with the second signals and adjusts the level of charge on the member to the reference level.

45. The method of claim 43 and wherein the member is moved in a first direction and in the step of measuring, measurements are made of the levels of charge at a plural number of locations on the member spaced in a direction transverse to the first direction.

46. The method of claim 45 and wherein the second signals modulate the beam to selectively adjust the charge levels at points in transverse locations having a respective level of charge for the location differing from the reference level.

47. The method of claim 45 and wherein the charged member is charged with a negative electrostatic charge at least to a level suitable for forming a developable electrostatic latent image.

48. The method of claim 43 and wherein in the step of measuring the measurements are made along both longitudinal and transverse tracks on the member and data for charge level at a location in a particular longitudinal track and transverse track is stored and wherein each of the second signals are generated in response to a position signal indicating the beam is to expose a location representing the intersection of a longitudinal and transverse track for which a charge level measurement is made.

49. In an electrophotographic reproducing apparatus having an electrostatically charged photoconductive member on which developable electrostatic images are to be formed on an image area of the member, means for measuring the level of charge on the member and adjusting means for providing signals for adjusting such level to a reference level, said reference level representing a maximum nominal charge level for use in developing an image on the area, the improvement which comprises:

first means for forming a narrow beam of radiation and exposing the member to such beam; and second means for modulating the beam when exposing the member with electrical image information signals representing an image to be formed on the member and with electrical signals for adjusting the level of charge on the member to the reference level to form a latent electrostatic image on the member.

50. The apparatus of claim 49 and wherein the first means exposes the member in point-by-point fashion across the image area of the member providing exposure at certain points in accordance with the image information signals; and the second means, at points on the image area of the member where no exposure is required by the image information signals, modulates the beam with signals for adjusting the level of charge on the member to the reference level.

51. The apparatus of claim 49 and including means for moving the member in a first direction and wherein the measuring means measures the levels of charge at a plural number of locations on the member spaced in a direction transverse to the first direction.

52. The apparatus of claim 51 and wherein the adjusting means and the second means cooperate to selectively adjust the charge level on the member at points in transverse locations having a respective level of charge differing from the reference level in accordance with the difference in charge level measurement for each such transverse location and the reference level.

53. The apparatus of claim 52 and including a corona charging station for charging the image area of the member with a negative electrostatic charge at least to a level suitable for forming a developable electrostatic latent image.

54. In an electrophotographic reproduction apparatus including a photoconductive member having an image area upon which a developable electrostatic latent image may be formed; means for charging the image area with an electrostatic charge to a level greater than a reference level, said reference level representing a maximum nominal charge level for developing an image on the area; means for exposing the charged area to image-bearing radiation by exposing the area in point-by-point fashion with a narrow beam of radiation modulated with imaging information to form the latent image by discharging selected points in the area to charge levels substantially lower than the reference level; the improvement which comprises:

means for modulating the beam with signals related to the difference between the level of charge applied to the member and the reference level to reduce the charge level to the reference level at points in the image area receiving substantially no image exposure.

55. In a method for forming a developable electrostatic latent image on an image area of a photoconductive member, the method including the steps of charging the area with an electrostatic charge to a level greater than a reference level, said reference level representing a maximum nominal charge level for developing an image on the area, exposing the charged area to image-bearing radiation by exposing the area in point-by-point fashion with a narrow beam of radiation modulated with imaging information to form the image by discharging selected points in the area to charge levels substantially lower than the reference level and the improvement which comprises the step of:

modulating the beam with signals related to the difference between the level of charge applied to the area and the reference level to reduce the charge level to the reference level at points in the area not selected for said discharging.

56. In a method for forming a developable electrostatic latent image on an image area of an electrostatically charged photoconductive member, the method including the steps of measuring the level of charge on the member and adjusting the level to a reference level suitable for developing selected points of the image area receiving substantially no image exposure, the improvement which comprises:

exposing a narrow beam of radiation on the member; and modulating the beam, when exposing the member, with first signals representing an image to be formed on the member and with second signals for adjusting the level of charge on the member to the reference level to form a latent electrostatic image on the member.

57. The method of claim 56 and wherein in the exposing step the beam exposes in point-by-point fashion, the image area of the member providing full exposure at certain points and no or less than full exposure at other points in accordance with the first signals and wherein at points on the image area of the member where no or less than full exposure is required by the first signals the beam is modulated with the second signals and adjusts the level of charge on the member to the reference level.

58. The method of claim 56 and wherein the member is moved in a first direction and in the step of measuring, measurements are made of the levels of charge at a plural number of locations on the member spaced in a direction transverse to the first direction.

59. The method of claim 58 and wherein the second signals modulate the beam to selectively adjust the charge levels at points in transverse locations having a respective level at points in transverse locations having a respective level of charge for the location differing from the reference level in accordance with the difference in charge level measurement for each such transverse location and the referenced level.

60. The method of claim 59 and wherein the member is charged with a negative electrostatic charge at least to a level suitable for forming a developable electrostatic latent image.

61. In a method for depositing an electrostatic charge on an area of a surface so that the level of charge on the surface is suitable for forming an electrostatic latent image upon exposure to image-bearing radiation, the method including the steps of moving the surface in a first direction past a charging station and depositing charge on the surface, measuring the level of charge deposited on the surface; adjusting the level of charge on the surface to a referenced level; and the improvement which comprises:

wherein in the step of measuring, measurements are made of the level of charge at each of a plural number of locations lying across the surface in a second direction transverse to the first direction; and wherein in the charge-adjusting step the photoconductor is exposed simultaneously at the same location to light that is modulated in accordance with image information for forming the latent image and to charge-reducing information for selectively reducing the charge at the location in accordance with a difference between the respective measurement of the level of charge for the particular location and the referenced level.

62. The method according to claim 61 and wherein the light comprises emissions from a laser that is scanned across the photoconductor.

63. In an electrophotographic reproducing apparatus having a moving electrostatically charged photoconductive member on which developable electrostatic images are formed, means for measuring the level of charge on the member and means for adjusting the level to a referenced level, the improvement which comprises:

first means for positioning said measuring means to measure the levels of charge at a plural number of locations on the member spaced transversely in the direction of movement of the member, and to produce signals representative of such levels; and second means responsive to such signals and operatively associated with said adjusting means for selectively adjusting the charge level at transverse locations having a level of charge differing from the referenced level; and wherein said adjusting means and second means comprise:

means for producing a laser beam;

means for scanning the beam transversely across the photoconductive member; and means for modulating the beam when scanning each location with signals representing an image to be formed on the photoconductor at the location and signals representing a difference between the respective level of charge measured for said location and the referenced level.

64. In an electrophotographic reproduction apparatus for moving along a path a photoconductive web capable of retaining an electrostatic charge, and including means for adjusting such charges to a referenced level, the improvement comprising:

first means for measuring the level of charge at each of several spaced locations transverse to the direction of movement of the web and for producing a signal representative of each measurement; second means responsive to the respective signal representing the level of charge at a particular transverse location and operatively associated with said adjusting means for selectively adjusting the charge level, at each respective transverse location having a level of charge differing from the referenced level; and wherein said adjusting means and second means comprise:

means for forming a laser beam;

means for scanning the beam transversely across the photoconductive web; and means for modulating the beam when scanning each location with signals representing an image to be formed on the photoconductor at the respective location and respective signals representing a difference between the level of charge measured for said location and the referenced level.

65. An electrostatographic reproduction apparatus which comprises:

a member having a surface upon which an electrostatic latent image may be formed;

means for charging the surface with a primary electrostatic charge;

means for moving the surface relative to the charging means in a first direction;

means for measuring the primary electrostatic charge level and providing first signals relative to the measurement of the charge level and second signals associated with the location of the reading relative to a reference spaced from said location in said direction of movement of the member; and means responsive to said first and second signals for reducing the primary charge level at selected points to a reference level to provide a more uniform electrostatic charge;

means for forming an electrostatic latent image on the member; and means for developing the latent image.

* * * * *